May 2, 1967  M. J. STRAUB ETAL  3,316,690
MACHINE FOR SEALING PACKAGES
Filed Feb. 13, 1964  4 Sheets-Sheet 1

INVENTORS.
Melvin J. Straub
Allen L. Hover
BY Jerry C. Anderson
Hovey, Schmidt, Johnson & Hovey
ATTORNEYS.

May 2, 1967 M. J. STRAUB ETAL 3,316,690
MACHINE FOR SEALING PACKAGES
Filed Feb. 13, 1964 4 Sheets-Sheet 2

INVENTORS.
Melvin J. Straub
Allen L. Hover
Jerry C. Anderson
BY Hovey, Schmidt, Johnson & Hovey
ATTORNEYS.

May 2, 1967   M. J. STRAUB ETAL   3,316,690
MACHINE FOR SEALING PACKAGES
Filed Feb. 13, 1964   4 Sheets-Sheet 4

INVENTORS.
Melvin J. Straub
Allen L. Hover
BY Jerry C. Anderson

Hovey, Schmidt, Johnson & Hovey
ATTORNEYS.

United States Patent Office 3,316,690
Patented May 2, 1967

3,316,690
MACHINE FOR SEALING PACKAGES
Melvin J. Straub, Hopkins, Allen L. Hover, and Jerry C. Anderson, Minneapolis, Minn., assignors to Gordon Johnson Company, Kansas City, Mo., a corporation of Missouri
Filed Feb. 13, 1964, Ser. No. 344,773
17 Claims. (Cl. 53—329)

This invention relates to packaging apparatus, and more particularly to a machine for sealing the junction between a pair of thermoplastic packaging sections having an article to be packaged disposed therebetween.

It has been determined that a highly suitable means for packaging food products, especially poultry prepared for marketing, comprises a pair of tray-like packaging sections formed of thermoplastic, heat-shrinkable, relatively self-sustaining material, each of the sections having a continuous, outwardly projecting, peripheral flange at the periphery thereof which mates with and is disposed in abutting juxtaposed relationship to the flange of the other section when the sections are placed in operative positions with an article to be packaged disposed therebetween.

A package formed by a pair of sections of the type described provides an attractive display for the article or product disposed therein, especially if one of the sections is transparent to permit viewing of the product, and if one of the sections is substantially complemental to the outer surface of the article or product when the latter is generally irregular in contour.

The construction of packaging sections of the aforesaid type permits the sections to be conveniently stored for subsequent use inasmuch as the sections may be telescoped one into the other because of the outwardly flared configuration of their peripheral flanges. Also, the package, comprised of the two sections, may be readily formed after an article has been placed in one section since a minimum of effort is expended to place the sections in operative positions, with the flange of one section being telescoped within the flange of the other adjacent section.

It is necessary that the package formed by the sections be sealed against the entrance of moisture and air into the package so as to prevent the possible contamination of the food product in the package as a result of contact with the atmosphere. However, in sealing the package, care must be taken not to destroy the attractive appearance of the package or to weaken its structural integrity. For these reasons, the package must therefore, be sealed at its periphery defined by the flanges and the flanges themselves must be joined together to close and thereby seal the junction therebetween and thereby seal the contents of the package from contact with the atmosphere.

Since the material forming the sections is thermoplastic and heat-shrinkable, it is important that sufficient heat be applied to the flanges to cause the latter to fuse together and form a continuous seal about the periphery of the package. This is to be accomplished, however, without subjecting the remaining portions of the sections to heat sufficient to weaken or even permanently damage the same.

The present invention provides a machine which is capable of sealing packages of the type described, and further, can be utilized for automatically placing such a package in a position to be heated, and after the heating and sealing operation of the package to remove it from the machine as another package to be sealed is substituted in its place. In this way, a large volume of packages can be sealed in a minimum of time with the only requirement being that the machine is supplied with packages by a single operator positioned nearby.

It is thus the primary object of the present invention to provide a machine for sealing packages of the aforesaid character by the application of heat without damaging the main body of the package, while at the same time providing an effective seal at the periphery thereof to prevent the entrance of air and moisture thereinto.

A further object of the instant invention is the provision of a machine for automatically delivering a package to be sealed to a location between a pair of heating elements whereby, after the package has been sealed by the application of heat thereto by the elements, the package may be removed by another package being automatically advanced into the position between the heating elements to thereby preclude manual removal of the package from the machine.

Still another object of the present invention is the provision of delivery means for automatically moving a package to be sealed between the aforesaid elements to thereby preclude having to manually place the package in the space between the elements and thereby obviate possible injury to an operator of the machine by contact with the elements themselves.

Yet another object of this invention is the provision of a machine for packaging a product between a pair of sections of the type described, and which assures that the sections are brought together as closely as possible to the product whereby the sections may be disposed about the product in a manner to prevent any substantial relative movement of the latter and the sections.

A further object of the present invention is the provision of a machine of the aforesaid character which is of a size permitting it to be conveniently placed in a poultry-processing plant near the end of the processing lines thereof whereby poultry products may be readily packaged utilizing sections of the type described without having to transport the products to a remote point to accomplish the packaging operation.

Figure 6:
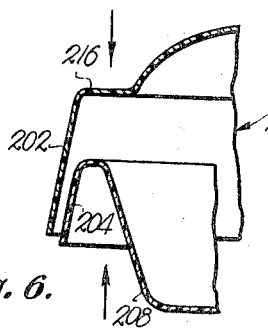
Figure 7:
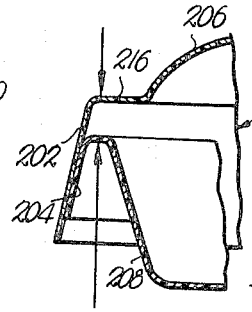
Figure 8:
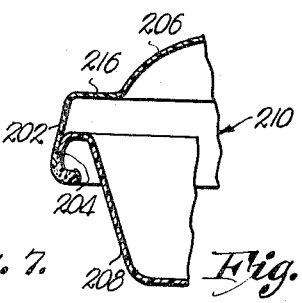
Figure 9:
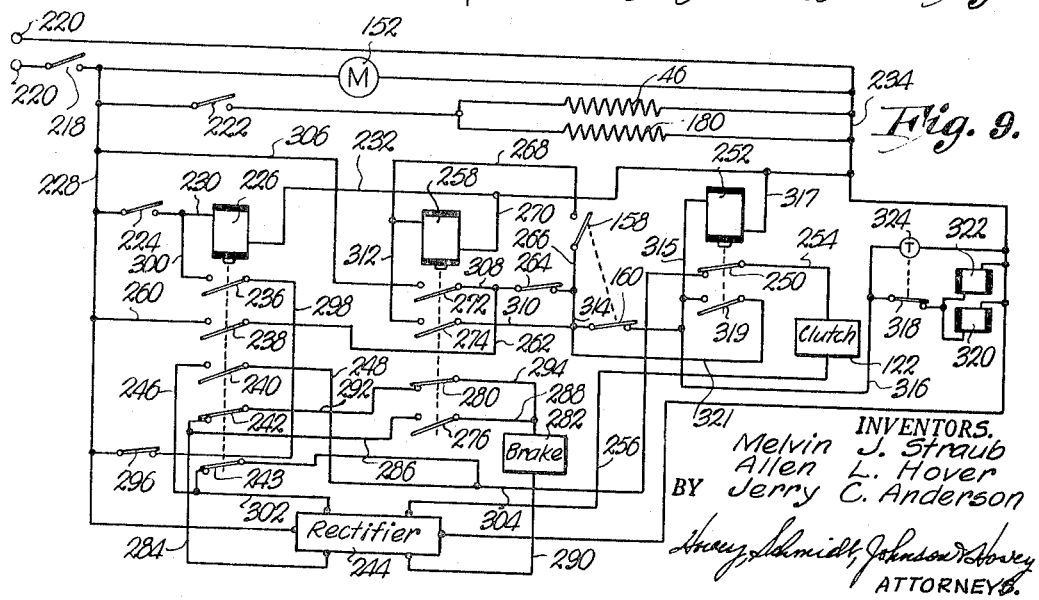

FIGS. 6, 7 and 8 are fragmentary, cross-sectional views of a package illustrating the successive positions of the peripheral flanges of the package as the same are moved together and subjected to heat to fuse the peripheral flanges together to seal the package; and FIG. 9 is a schematic wiring diagram of a control circuitry associated with the machine of the present invention for effecting the operation thereof.

The present invention provides a machine for sealing the juxtaposed, outwardly projecting peripheral flanges of a pair of tray-like packaging sections of thermoplastic material as the sections present a package for an article disposed therebetween. The package formed by the sections is disposed on a platen which is mounted between a pair of heating elements for movement toward and away from one of the elements. The other element is also mounted for movement toward and away from said one element so that, upon movement of the platen and the other element toward the said one element, a package supported on the platen will be moved to a position with the peripheral flanges thereof in thermal interchange relationship to said one element. In addition, the other element moves a sufficient distance to also be placed in thermal interchange relationship to the peripheral flanges so that the latter become fused together to seal the periphery of the package and prevent the entrance of air and moisture thereinto.

An important feature of the invention resides in the structure for delivering a package to the platen and includes a platform which is movable toward the platen and into a slot formed in the upper supporting surface of the platen. Means is provided for lowering the platform into the slot after the package has been placed on the platen so that the platform may be retracted from the platen while the package remains supported thereon.

Following the heating and sealing operation, the platen returns to its initial position and the package thereon is removed therefrom by the platform advancing once again toward the plate with another package to be sealed. Thus, the steps of placing a package on the platen and removing the package therefrom, may be accomplished substantially automatically and without operator attention.

Figure 1:
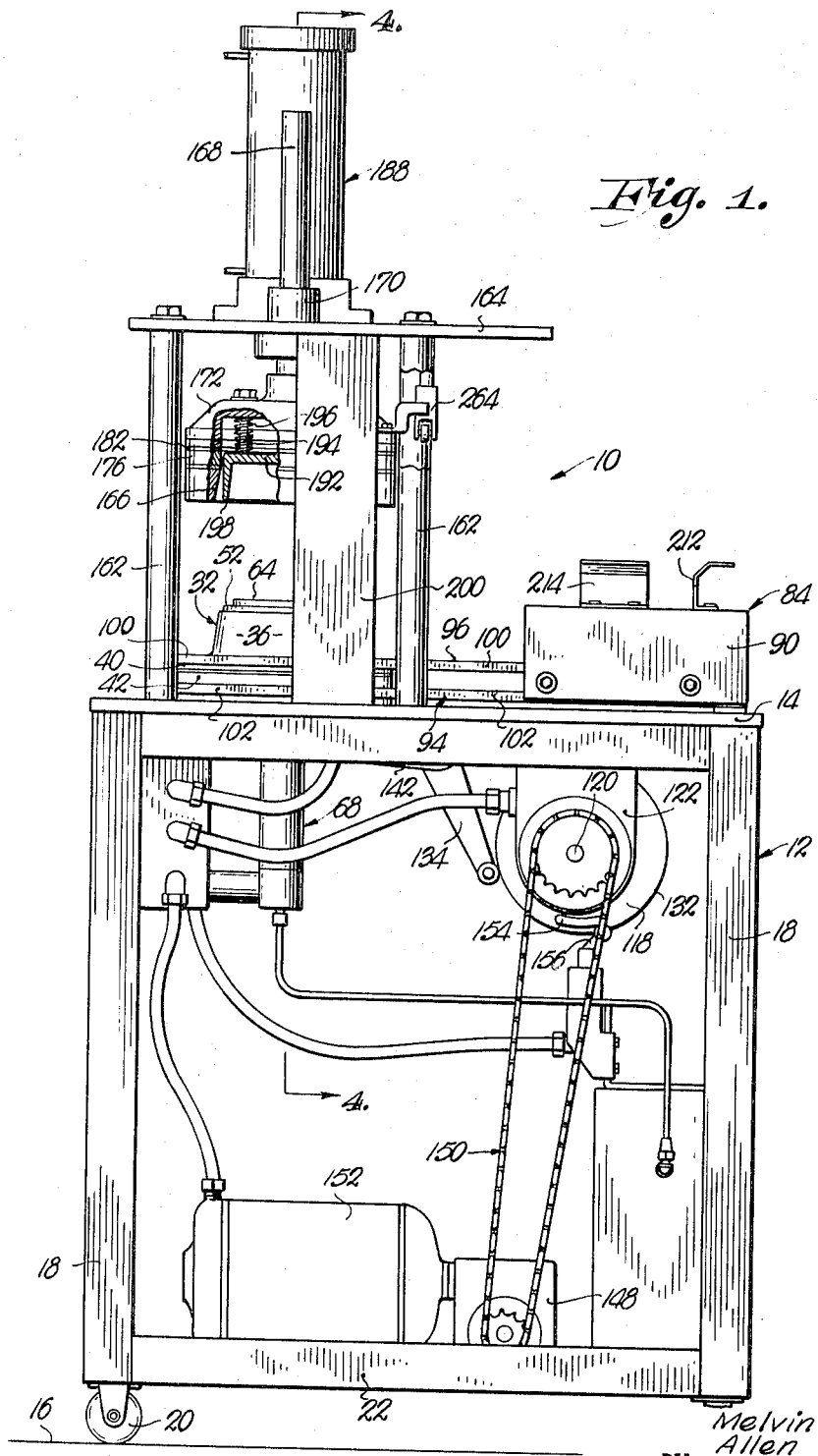
FIGURE 1 is a side elevational view of a machine made pursuant to the concepts of the present invention, parts being broken away and in section to illustrate details of construction.

Machine 10 of the present invention includes a support 12 having a substantially horizontal plate 14 disposed above the level of the floor 16 by legs 18 and providing a table top for structure hereinafter described. Legs 18 are provided with casters 20 to facilitate moving machine 10 from place-to-place. A base 22 is rigid to the bottom or lower extremities of legs 18 and is spaced above floor 16 as shown in FIG. 1. Suitable panels may be provided for enclosing the space defined by legs 18 so that equipment positioned in this space can be housed and conveniently concealed from view.

Figure 3:
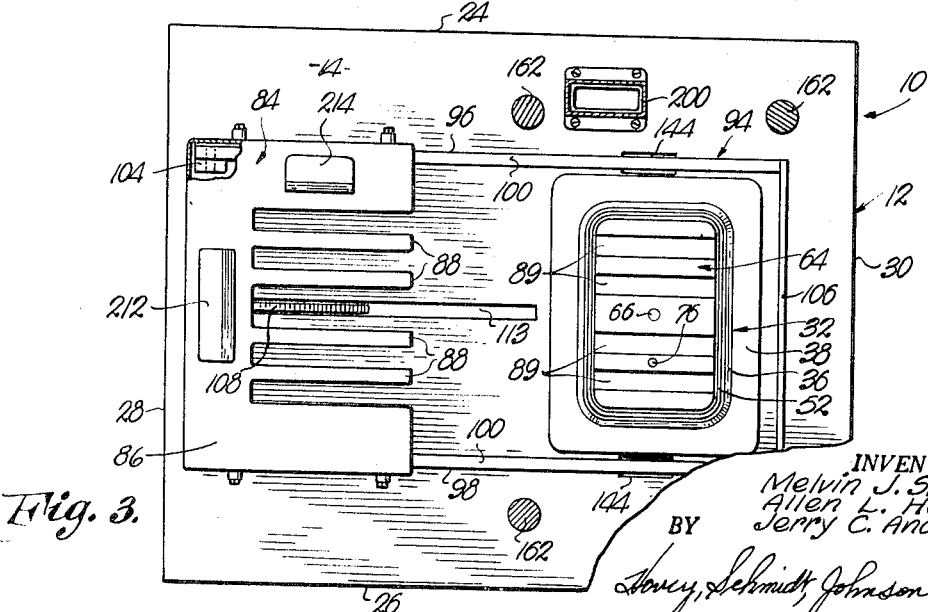
FIG. 3 is a view taken along line 3—3 of FIG. 2.

Plate 14 is generally rectangular in configuration and is provided with a pair of side edges 24 and 26, and a pair of end edges 28 and 30 as shown in FIG. 3. A heating die or element 32 is rigidly coupled to the upper surface of plate 14 adjacent edge 30 and substantially midway between edges 24 and 26 as shown in FIG. 3.

Figure 4:
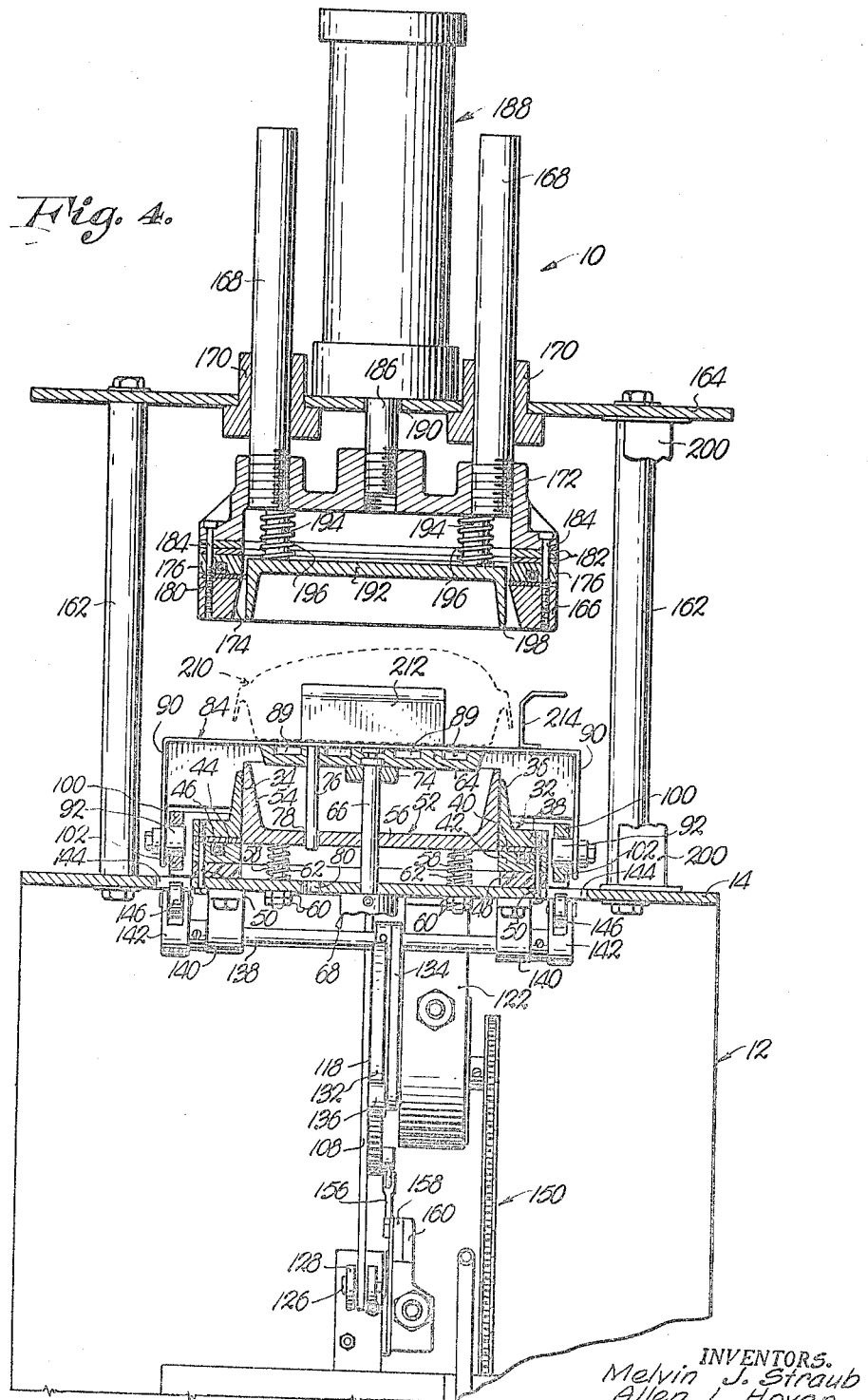
FIG. 4 is a view taken along line 4—4 of FIG. 1 and illustrating the package of thermoplastic material to be sealed between and spaced from a pair of heating elements before the elements are brought together and into thermal interchange relationship with the peripheral flanges of the package.

Die 32 is rectangular and is provided with a continuous vertical, inner surface 34 and a continuous inclined, outer surface 36 converging to inner surface 34 as the upper extremity of the latter is approached. This is illustrated in FIG. 4 wherein die 32 is shown in cross section. The width of surface 36 is less than the width of surface 34, there being a continuous flange 38 projecting outwardly from the normally lowermost extremity of die 32.

Die 32 is formed from a metallic material having a relatively high coefficient of thermal conductivity. A rectangular, heat-conducting ring 40 is in contact with the underside of die 32 and in contact with the upper surface of a similar, rectangular, heat-conducting ring 42 provided with a rectangular slot 44 therein which receives a heating device 46 of the resistance type. An insulating ring 48 is disposed between ring 42 and the upper surface of plate 14, and a number of machine screws 50 pass through rings 40, 42 and 48 and are threaded into flange 38 to rigidly secure die 32 to plate 14.

Figure 5:
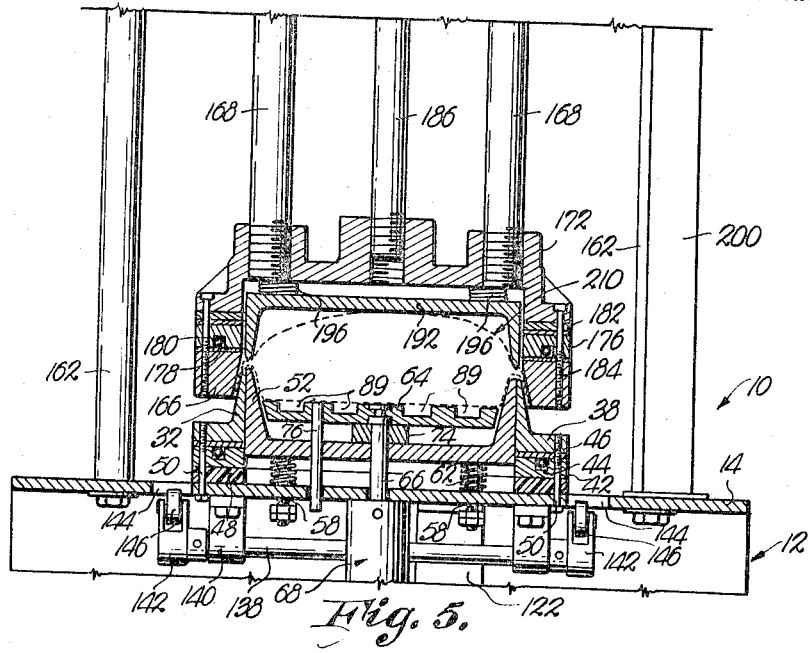
FIG. 5 is an enlarged, fragmentary view of the machine, partly in section and illustrating the positions of the heating elements and the package therebetween when the elements are in thermal interchange relationship with the peripheral flanges of the package.

A tray-like receptacle 52 having a continuous vertical, outer surface is received within die 32 as shown in FIGS. 4 and 5, receptacle 52 having a continuous, inclined, inner surface 54 which extends inwardly as the bottom 56 of receptacle 52 is approached. A pair of bolts 58 are rigid to and project downwardly from bottom 56 and pass through openings (not shown) in plate 14, the openings being of greater diameter than the diameter of bolts 58 so that the latter may be shiftable through the openings. Nuts 60 are carried on the lower extremities of bolts 58 and coil springs 62 are disposed about bolts 58 to bias receptacle 52 upwardly into the position illustrated in FIG. 4. In this position, the upper extremity of receptacle 52 is above the upper extremity of die 32.

Platen 64 is mounted above and in alignment with receptacle 52 by the piston rod 66 of a pneumatic piston and cylinder assembly 68 rigid to the underside of plate 14 in any suitable manner. Rod 66 extends through an opening 70 in plate 14 and through an opening 72 in bottom 56. A spacer 74 is rigid to rod 66 adjacent the underside of platen 64. A guide rod 76 is rigid to and extends downwardly from platen 64 and is shiftably received within an opening 78 in bottom 56 and is aligned with an opening 80 in plate 14.

When assembly 68 is actuated, rod 66 is pulled downwardly and, therefore, platen 64 is caused to descend therewith. Spacer 74 engages bottom 56 and urges receptacle 52 downwardly a small distance during which springs 62 are compressed and platen 64 continues downwardly until the same assumes the position illustrated in FIG. 5. It is noted that the outer, continuous surface 82 of platen 64 is rectangular, beveled and complemental to the inner surface 54 of receptacle 52. As platen 64 shifts downwardly, rod 76 moves through openings 78 and 80 and prevents rotation of platen 64 with respect to receptacle 52.

When assembly 68 is de-actuated, rod 66 is forced upwardly to in turn raise platen 64 to the position of FIG. 4. Simultaneously, receptacle 52 moves upwardly to its position illustrated in FIG. 4. Upward movement of receptacle 52 facilitates movement of an object on platen 64 away from die 32.

A package-supporting platform 84 is carried on plate 14 for movement toward and away from die 32. As shown in FIG 3, platform 84 is comprised of a C-shaped plate 86 having a number of fingers 88 extending laterally therefrom. Fingers 88 are parallel with each other, are spaced apart, and are aligned with a corresponding number of transverse slots 89 formed in the upper surface of platen 64 as shown in FIG. 3. Plate 86 is provided with a pair of downwardly extending sides 90, each having a pair of rollers 92 journalled thereon at the lower extremity thereof.

A track 94 comprised of a pair of track sections 96 and 98 is carried on plate 14 for pivotal movement about a horizontal axis substantially parallel with and adjacent end edge 28. Each of sections 96 and 98 includes a pair of elongated, transversely rectangular rods 100 and 102 which are substantially parallel and are pivoted to an ear 104 rigid to plate 14 and adjacent edge 28. A rigid strap 106 interconnects the ends of sections 96 and 98 remote from the axes of pivoting movement thereof.

Rollers 92 on sides 90 are received between rods 100 and 102 of the corresponding sections 96 and 98. As shown in FIG. 3, sections 96 and 98 are disposed on opposed ends of die 32 and strap 106 is on the side thereof adjacent edge 30. Since rods 100 and 102 are parallel, platform 84 is movable toward and away from die 32. The upper surface of platform 84 is normally slightly below the upper surface of platen 64 as shown in FIG. 4 so that an object carried on platform 84 will have to be elevated a small distance so that it may be placed properly on platen 64. Since fingers 88 are aligned with slots 89, lowering of platform 84 after an object has been placed on platen 64, will move platform 84 out of contact with the object and the platform may then be retracted by moving the same horizontally away from platen 64 while the object remains thereon.

Means for moving platform 84 comprises a link 108 pivotally coupled to an ear 110 on a depending flange 112 rigid to platform 84. Link 108 passes through a slot 113 in plate 14 and has a longitudinally extending slot 114 which receives a projection 116 on a disc 118 mounted eccentrically on a shaft 120 projecting horizontally from an electric clutch mechanism 122 rigid to the underside of plate 14. The lower extremity of link 108 also has a longitudinally extending slot 124 which shiftably receives a pin 126 carried by an ear 128 on an L-shaped bracket 130 rigid to the adjacent leg 18. As disc 118 is rotated in a clockwise sense through one revolution, link 108 is first swung in a clockwise sense until platform 84 is at one extremity of its path of travel adjacent die 32 and then link 108 is swung in the opposite direction until platform 84 is in its position illustrated in FIG. 2.

Figure 2:
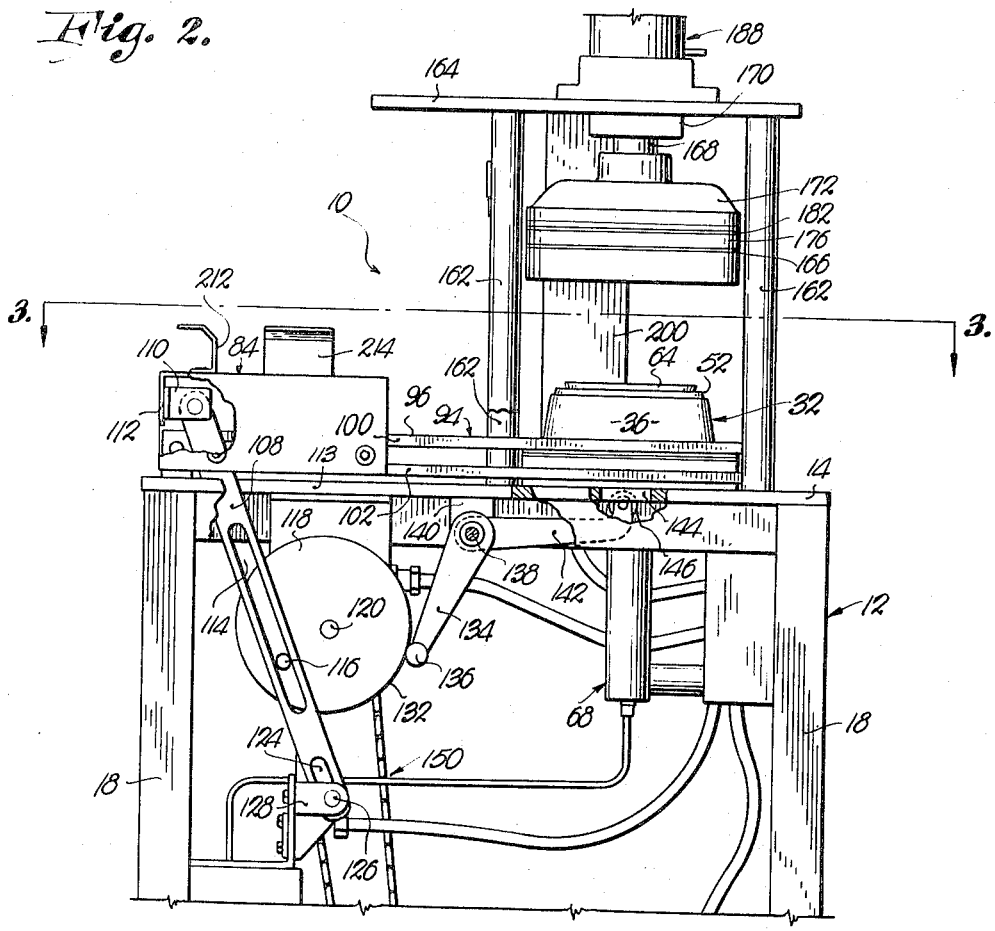
FIG. 2 is a view similar to FIG. 1 but looking at the opposite side of the machine.

The outer periphery 132 of disc 118 serves as a cam for a crank arm 134 having a roller 136 thereon at the lower end thereof in engagement with periphery 132. Arm 134 is rigid to a shaft 138 journalled on the underside of plate 14 by bearings 140 for rotation about a horizontal axis. A pair of arms 142 is rigid to the respective ends of shaft 138 and rotate therewith. Arms 142 extend outwardly from shaft 138 and toward edge 30 as shown in FIG. 2, the center of mass of the combined structure comprising arms 142 is such that shaft 138 is biased for rotation in a clockwise sense when viewing FIG. 2. Thus, roller 136 is maintained in engagement with periphery 132 at all times.

Plate 14 has a pair of openings 144 therein adjacent the ends of die 32 and in alignment with sections 96 and 98 as shown in FIG. 3. The ends of arms 142 underlie openings 144 and pass upwardly therethrough and into engagement with rods 102 of sections 96 and 98 when arm 134 is swung in a counterclockwise sense by disc 118 when viewing FIG. 2. Rollers 146 are carried on the outer ends of arms 142 and bear against respective rods 102.

The configuration of periphery 132 is such that, as platform 84 moves toward die 32, sections 96 and 98 will be elevated simultaneously and through the same distance so that an object carried on platform 84 will be properly placed on platen 64 as sections 96 and 98 descend to their normal positions illustrated in FIG. 2. Sections 96 and 98 are held in an elevated position until platform 84 is substantially over platen 64, at which time sections 96 and 98 descend and, for all practical purposes, platform 84 moves downwardly with very little additional forward movement. As platform 84 moves downwardly, fingers 88 are received in slots 89 and after sections 96 and 98 have been lowered to their normal positions, fingers 88 are below the upper surface of platen 64 which supports the object placed thereon by platform 84. Platform 84 may then be retracted by link 108 as the latter moves in the opposite direction and as an object placed on platen 64 remains on the latter.

Mechanism 122 is coupled to a gear reducing device 148 by a chain and sprocket assembly 150, device 148 being in turn coupled with the drive shaft of an electric motor 152 secured to base 22.

An arcuate projection 154 is carried on the face of disc 118 opposed to the face from which projection 116 extends and is engageable with a shiftable pole 156 which is coupled with a pair of single-pole, single-throw switches 158 and 160 shown in FIG. 4, switch 158 being normally open and switch 160 being normally closed. As disc 118 rotates, projection 154 engages pole 156 and closes switch 158 and opens switch 160. The switches return to their normal positions when projection 154 disengages pole 156.

A number of upright support rods 162 are rigid to and extend upwardly from the upper surface of plate 14 to mount another plate 164 in vertically spaced relationship to plate 14. An upper die or heating element 166 is carried on plate 164 for movement toward and away from die 32, and in this respect, a pair of guide rods 168 is shiftably received within respective bushings 170 rigid to plate 164 and threaded into a die carrier 172 as shown in FIG. 4.

Die 166 is of a material similar in all respects to the material of die 32 and is provided with a beveled, continuous inner surface 174 which is complemental to the outer surface 36 of die 32. Since die 166 is vertically aligned with die 32, downward movement of die 166 is sufficient to move surface 174 into complemental relationship with surface 36.

A rectangular, heat-conducting ring 176 is in contact with the upper extremity of die 166 and is provided with a slot 178 therein for receiving a rectangular, resistance-type heater 180. Insulator spacers 182 separate ring 176 from carrier 172 and a number of machine screws 184 carried by carrier 172 are threaded into die 166 to connect the latter to carrier 172.

The piston rod 186 of a pneumatic piston and cylinder assembly 188 rigid to the upper surface of plate 164, passes through an opening 190 in plate 164 and is threaded into carrier 172 as shown in FIG. 4. As assembly 188 is actuated, die 166 is lowered into the position thereof illustrated in FIG. 5 adjacent and complemental to die 32 as shown.

An inverted tray-like receptacle 192 is carried by bolts 194 on carrier 172 in the manner shown in FIGS. 1 and 4. Bolts 194 are shiftable through openings (not shown) in carrier 172 so that receptacle 192 may be shifted upwardly from its position illustrated in FIG. 4. Coil springs 196 surrounding bolts 194 bias receptacle 192 downwardly.

The lower, continuous edge 198 of receptacle 192 provides an abutment which is carried downwardly with die 166 and engages the periphery of an object on platen 64 when the periphery of the object overlies the upper extremities of die 32 and receptacle 52. As edge 198 engages the object, receptacle 192 is yieldably urged upwardly into the space provided in carrier 172 as shown in FIG. 5 so that the abutment formed by edge 198 serves as a backing support for the object, and also causes the object to be forced downwardly, depending upon the construction of the same.

Rods 168 and assembly 188 may be conveniently housed in panel structure (not shown) to conceal the same, and a tube 200 communicates the space above plate 164 with the space below plate 14 so that air lines to and from assembly 188 may pass through tube 200 without being exposed.

Machine 10 is adapted for use as a means for sealing the juxtaposed, outwardly projecting peripheral flanges 202 and 204 of a pair of adjacent packaging sections 206 and 208 of thermoplastic, heat-shrinkable material which form a package 210 when an object is disposed therebetween and the flanges 202 and 204 thereof are in the positions illustrated in FIG. 6. Flanges 202 and 204 are continuous and surround the corresponding sections 206 and 208, and furthermore, are of substantially the same dimensions and configuration as die 32. Similarly, the inner surface 174 of die 166 is complemental to the outer configuration of flanges 202 and 204 so that when the flanges are between dies 32 and 166, heat is imparted thereto from the heated dies to cause the flanges 202 and 204 to be fused together and to shrink into a continuous seal at the periphery of the package formed by sections 206 and 208.

Package 210 is initially placed on platform 84 and properly positioned by guides 212 and 214 extending upwardly from platform 84 as shown in FIGS. 1–4. Platform 84 moves package 210 onto platen 64 and then is retracted. Thereafter, platen 64 and die 166 are lowered into their positions of FIG. 5. Simultaneously, receptacle 192 is lowered to engage the horizontal, continuous margin 216 to press the same and thereby force section 206 toward section 208 until package 210 assumes the shape illustrated in FIG. 7. At this point, flange 204 is in contact with surface 36 of die 32 and flange 202 is in contact with surface 174 of die 166. Flanges 202 and 204 are therefore, in thermal interchange relationship with dies 32 and 166 so that the heat imparted to the flanges will cause the same to be fused together and to shrink to form the seal for package 210. Since flange 202 is longer than flange 204, the shrinkage of the flanges will cause an inward curling thereof as shown in FIG. 8.

After die 166 and platen 64 are elevated, the sealed package remains on platen 64 and is removed therefrom by being contacted by fingers 88 as platform 84 approached platen 64 with another package to be sealed.

Operation

The operation of machine 10 is best described by referring to the schematic wiring diagram of FIG. 9.

In the schematic, motor 152 is energized when main power switch 218 is closed to supply power to motor 152 from terminals 220 which are connected to a suitable source of power. Similarly, heating devices 46 and 180 are placed in parallel with each other and energized when heater switch 222 is closed, it being clear that switch 218 must be closed before power can be supplied to devices 46 and 180. Thus, motor 152 and devices 46 and 180 are continuously actuated. A suitable thermostat may be employed with devices 46 and 180 to limit the temperature at which dies 32 and 166 are heated.

A start switch 224 is closed and energizes a relay 226 through leads 228, 230, 232 and 234. This causes normally open switches 236, 238 and 240 of relay 226 to close, and switches 242 and 243 of relay 226 to open.

A rectifier 244 is coupled with leads 228 and 234 and is energized when switch 218 is closed. When switch 240 is closed, power is supplied to clutch mechanism 122 from rectifier 244 through lead 246, switch 240, lead 248, normally closed switch 250 of another relay 252, lead 254, mechanism 122 and lead 256. When this occurs, disc 118 rotates in a clockwise sense when viewing FIG. 2, and platform 84 is moved to a location adjacent platen 64. A package 210 carried on platform 84 is deposited on platen 64 and disc 118 continues to rotate until the same has made one complete revolution.

As disc 118 is returning to its initial position, projection 154 engages pole 156 to close switch 158 and open switch 160. When this occurs, a relay 258 is energized by the following circuit: lead 228, lead 260, switch 238 (closed because relay 226 is energized) lead 262, normally closed switch 264, lead 266, switch 158, lead 268, relay 258, lead 270, lead 232 and lead 234. When relay 258 is energized, its normally open switches 272, 274 and 276 are closed. Its normally closed switch 280 is thereby opened. As switch 276 is closed, rectifier 244 supplies power to a brake mechanism 282 through the following circuit: rectifier 244, lead 284, lead 286, switch 276, lead 288, mechanism 282, and lead 290.

Brake mechanism 282 is associated with clutch 122 and applies braking force to shaft 120 to stop disc 118 when the latter is in the position of FIG. 2. Simultaneously, clutch 122 is de-energized by the opening of switch 250 upon the energization of relay 252. Relay 252 is energized when switch 272 is closed, the latter in turn being closed when relay 258 is energized. Relay 252 is thus energized through the following circuit: lead 228, lead 306, switch 272, lead 308, switch 264, lead 314, switch 160, lead 315, relay 252, lead 317, lead 232 and lead 234.

As relay 252 is energized, switch 319 thereof which is normally open, is closed and forms a holding circuit therefor through the following: lead 228, lead 306, switch 272, lead 308, switch 264, lead 314, lead 321, switch 319, lead 315, lead 317, lead 232 and lead 234. Thus, regardless of the position of switch 160, relay 252 will be energized so long as switch 272 is closed.

Brake mechanism 282 remains energized at all times when switch 218 is closed inasmuch as, when switch 276 is open, a circuit containing rectifier 244 and brake mechanism 282 is formed by means of the following: lead 284, switch 242 (relay 226 de-energized), lead 292, switch 280 (relay 258 de-energized), lead 294, mechanism 282 and lead 290.

When relay 226 is energized, switch 236 forms a holding circuit therefor through the following: lead 228, stop switch 296, lead 298, switch 236, lead 300, lead 232 and lead 234. If switch 296 is opened as a package is being delivered to platen 64, relay 226 will be de-energized and switch 240 will open. However, switch 243 will close and form a circuit by means of the following: lead 302, switch 243, lead 304, lead 248, switch 250, lead 254, clutch mechanism 122 and lead 256. Thus, platform 84 will continue to deliver the package to platen 64 even though relay 226 is de-energized. The de-energization of relay 226 will not effect the operation of relay 258 inasmuch as a holding circuit will have been established for relay 258 when switches 272 and 274 thereof are closed. This holding circuit is formed by the following: lead 228, lead 306, switch 272, lead 308, switch 264, lead 310, switch 274, lead 312, lead 270, lead 232 and lead 234.

After a package has been delivered to platen 64 and platform 84 has returned to its initial position, assemblies 68 and 188 are actuated by the following circuit: lead 228, lead 260, switch 238 (assuming switch 296 has not been opened), lead 262, switch 264, lead 314, switch 160 (closed now that disc 118 is in its initial position), lead 316, normally closed timer switch 318, solenoid valves 320 and 322 mounted in parallel, and lead 234. Timer mechanism 324 is mounted in parallel with the branch containing switch 318 in series with valves 320 and 322. Mechanism 324 is adjusted to open switch 318 after a predetermined length of time.

When valves 320 and 322 are actuated, air is supplied to assemblies 68 and 188 to cause platen 64 and die 166 to move downwardly simultaneously into their positions illustrated in FIG. 5. Dies 32 and 166 are then moved into thermal interchange relationship with flanges 202 and 204 of package 210 to cause the same to be fused together and to form the seal at the periphery of the package. When mechanism 324 opens switch 318, valves 320 and 322 are de-actuated and die 166 and platen 64 are simultaneously raised into their positions shown in FIG. 4.

If switch 296 is opened at any time during the operation of machine 10, the sealing operation will continue even though switch 238 is opened upon de-energization of relay 226 by opening switch 296. Such continued operation of machine 10 is due to the following circuit: lead 228, lead 306, switch 272, lead 308, switch 264, lead 314, switch 160, lead 316, switch 318, valves 320 and 322 and lead 234.

As die 166 is elevated, the same trips switch 264 mounted in the manner shown in FIG. 1 to open switch 264 and in turn, braking the holding circuit of relay 258 containing switches 272 and 274. Relay 258 is thus de-energized and similarly, relay 252 is also de-energized inasmuch as this energizing circuit contains switch 264.

Machine 10 will continue to operate after a package 210 has been sealed in the foregoing manner if switch 296 remains closed. Fingers 88 are positioned to push a sealed package 210 off platen 64 and onto a chute adjacent thereto as platform 84 delivers another package to be sealed to platen 64. If switch 296 is opened at any time, the sealing operation will continue for the package being concurrently handled by the machine, but the machine will cease to operate after that particular package has been sealed. Thereafter, to initiate the operation of machine 10, switch 224 will have to be energized.

Machine 10 is capable of continuous automatic operation, or may be operated only once, depending upon the number of packages to be sealed. By the proper actuation of switches 224 and 296, the same may be rendered either automatic or in condition for single operation. The only attention required by machine 10 is that an operator be stationed thereby to place packages 210 on platform 84, each package being initially formed in the manner of FIG. 6.

The removal of a sealed package from platen 64 is automatic and the operator need not handle packages in and around dies 32 and 166 inasmuch as fingers 88 force a sealed package 210 off platen 64 as another package to be sealed is placed thereon. Suitable conveying means may be aligned with platen 64 to receive a package 210 removed therefrom and to transfer the sealed package to a collection region.

Having thus described the invention, what is claimed as new and desired to be secured by Letters Patent is:

1. A machine for sealing the juxtaposed outwardly projecting, peripheral flanges of a pair of adjacent packaging sections of thermoplastic material and presenting a package for an article between said sections, said machine comprising:

a support;

a pair of normally spaced-apart, relatively shiftable members mounted on said support, one of said members including a heating element and the other of said members including a package-supporting platen;

means shiftably mounted on the support for placing a package onto said platen, the latter having structure for receiving said package placing means in spaced relationship from a package supported by the platen to thereby permit said package placing means to be shifted away from said platen while said package remains thereon; and means carried by said support for moving a first of said members relative to a second of said members in a direction to place the flanges of the sections of a package in thermal interchange relationship with said heating element when said package is supported on said platen, whereby the flanges may be caused to become fused together and to seal the package at its periphery.

2. A machine for sealing the juxtaposed, outwardly projecting peripheral flanges of a pair of adjacent packaging sections of thermoplastic material and presenting a package for an article between said sections, said machine comprising:

a support;

a pair of normally spaced-apart, relatively shiftable members mounted on said support, one of said members including a heating element and the other of said members including a package-supporting platen;

means shiftably mounted on the support for placing a package onto said platen, the latter having structure for receiving said package placing means in spaced relationship below a package supported by the platen to thereby permit said package placing means to be shifted away from said platen while said package remains thereon;

means carried by said support for moving a first of said members relative to a second of said members in a direction to place the flanges of the sections of a package in thermal interchange relationship with said heating element; and means providing an abutment for said flanges when the latter are in thermal interchange relationship with said heating element.

3. A machine for sealing the juxtaposed, outwardly projecting peripheral flanges of a pair of adjacent packaging sections of thermoplastic material and presenting a package for an article between said sections, said machine comprising:

a support;

a pair of normally spaced-apart, relatively shiftable members mounted on said support, one of said members including a heating element and the other of said members including a platen having a package-supporting surface provided with a slot therein;

a package-supporting platform;

means carried by the support and coupled with said platform for moving the latter toward and away from said platen, said platform being movable into said slot by said platform moving means with the platform being disposed below said surface when in said slot to permit a package carried by the platform to be placed on said platen as the platform enters said slot; and means carried by said support for moving a first of said members relative to a second of said members in a direction to place the flanges of the sections of a package in thermal interchange relationship with said heating element when said package is supported on said platen, whereby the flanges may be caused to become fused together and to seal the package at its periphery.

4. A machine for sealing the juxtaposed, outwardly projecting peripheral flanges of a pair of adjacent packaging sections of thermoplastic material and presenting a package for an article between said sections, said machine comprising:

a support;

a heating element secured to said support;

a package-supporting platen mounted on said support above said heating element for movement toward and away from the latter;

means coupled with said platen for moving the latter and thereby a package supported thereon toward said heating element and into a position with the flanges of the package disposed in thermal interchange relationship to said heating element;

an abutment mounted on said support above said platen for movement into and out of engagement with the package when the latter is at said position to provide a backing support therefor:

means coupled with said abutment for moving the same; and means mounted on the support for movement toward and away from said platen and disposed for placing a package on the platen, the latter having structure for receiving said package-placing means in spaced relationship from a package supported by the platen to thereby permit said placing means to be moved away from said platen while said package remains thereon.

5. A machine for sealing the juxtaposed, outwardly projecting peripheral flanges of a pair of adjacent packaging sections of thermoplastic material and presenting a package for an article between said sections, said machine comprising:

a support;

a pair of heating elements, one of said elements being rigid to said support, the other of said elements being shiftably mounted on the support for movement toward and away from said one element;

a package-supporting platen mounted on said support between said elements and normally disposed in a location spaced from said elements, said platen being movable toward and away from said one element;

means mounted on said support for movement toward and away from said platen and disposed for placing a package on the platen when the latter is in said location, said platen having structure for receiving said package-placing means in spaced relationship from a package supported by the platen to thereby permit said placing means to be moved away from said platen while said package remains thereon;

means coupled with said platen for moving the latter and thereby a package supported thereon toward said one element and into a position with the flanges of the package disposed in thermal interchange relationship to said one element; and means coupled with said other element for moving the same into thermal interchange relationship to said flanges when the package is in said position, whereby the flanges may be caused to become fused together and to seal the package at its periphery.

6. A machine for sealing the juxtaposed, outwardly projecting peripheral flanges of a pair of adjacent packaging sections of thermoplastic material and presenting a package for an article between said sections, said machine comprising:

a support;

a pair of heating elements, one of said elements being rigid to said support, the other of said elements being shiftably mounted on the support for movement toward and away from said one element;

a package-supporting platen mounted on said support between said elements and normally disposed in a location spaced from said elements, said platen being movable toward and away from said one element;

means mounted on said support for movement toward and away from said platen and disposed for placing a package on the platen when the latter is in said location, said platen having structure for receiving said package-placing means in spaced relationship from a package supported by the platen to thereby permit said placing means to be moved away from said platen while said package remains thereon;

means coupled with said platen for moving the latter and thereby a package supported thereon toward said one element and into a position with the flanges of the package disposed in thermal interchange relationship to said one element;

means coupled with said other element for moving the same into thermal interchange relationship to said flanges when the package is in said position, whereby the flanges may be caused to become fused together and to seal the package at its periphery; and an abutment movable into engagement with a package when the latter is at said position to provide a backing support therefor as the flanges of said package are heated by said elements.

7. A machine as set forth in claim 6, and means yieldably securing said abutment to said other element to permit the abutment to yield in a direction opposed to its direction of movement toward a package on the platen when the abutment is in engagement with said package and when said other element is in thermal interchange relationship to said flanges.

8. A machine as set forth in claim 6, said package-placing means including a package-supporting finger, said structure including a slotted, package-supporting surface disposed for receiving said finger in the slot thereof after a package has been placed on said platen.

9. A machine as set forth in claim 6, said package-placing means including a package-supporting platform, means mounting said platform on the support for movement toward and away from said platen, and means coupled with said platform mounting means for lowering the platform onto said platen to permit a package supported by the platform to be placed on said platen.

10. A machine as set forth in claim 9, said platform mounting means including an elongated track pivotally mounted at one end thereof on said support, said lowering means including an arm swingably mounted on said support and engageable with said track for effecting the pivoting of the latter upwardly as the platform moves toward said platen and then downwardly as the platform is above said platen, and means coupled with the arm for swinging the same.

11. A machine as set forth in claim 10, said arm-swinging means including a shaft rotatably mounted on said support, one end of said arm being rigid to said shaft, the opposite end of the arm being engageable with said track to successively raise and lower the same as said shaft is rotated in opposed directions, and cam means coupled with said shaft for rotating the same.

12. A machine as set forth in claim 9, said structure including a slotted, package-supporting surface disposed for receiving said platform in the slot thereof to space the platform from a package supported on said surface.

13. In a machine for sealing packages:
a platen provided with an upper, package-supporting surface having a slot therein;
a package-supporting platform; and
means coupled with said platform for moving the latter toward the platen and into said slot with the platform being disposed below said surface when the same is in said slot, whereby a package carried by said platform will be placed on said platen as the platform enters said slot, said platform moving means including elongated, platform-mounting structure shiftably carried by said support and extending toward said platen, said structure being disposed for lowering said platform into said slot when said structure is shifted in one direction and when said platform is adjacent said platen, and mechanism coupled with said platform for reciprocating the same relative to said structure, said platform mounting structure including a track pivotally coupled to said support, and means shiftably mounting said platform on said track.

14. In a machine as set forth in claim 13, said track being pivotally coupled adjacent the end thereof remote from said platen, and disposed for lowering the platform into said slot as the track pivots in said one direction.

15. In a machine as set forth in claim 13, said platform moving means further including an arm rotatably mounted on said support and engageable with said track to effect the pivoting of the latter in said one direction, and means coupled with said arm for rotating the same to effect pivoting of the track in said one direction.

16. In a machine as set forth in claim 15, said arm rotating means including a shaft journalled on said support, said arm being rigid to said shaft, the center of mass of said arm being disposed to bias said shaft for rotation in a direction to cause said track to pivot in said one direction, a crank rigid to said shaft and extending laterally therefrom, and cam means normally in engagement with said crank for limiting the rotation of said shaft in said one direction to a predetermined arc.

17. In a machine as set forth in claim 20, said platform being normally horizontally aligned with said platen, said cam means being disposed for deflecting said crank to rotate said shaft in the opposite direction and thereby raise the platform relative to said platen before said shaft is rotated through said predetermined arc to lower the platform into said slot.

References Cited by the Examiner
UNITED STATES PATENTS

| 3,017,729 | 1/1962 | Cheeley | 53—184 X |
| 3,071,906 | 1/1963 | Zebrarth et al. | 53—184 X |
| 3,201,912 | 8/1965 | Wozniak | 53—61 |
| 3,224,163 | 12/1965 | Ray | 53—373 X |

TRAVIS S. McGEHEE, *Primary Examiner.*